United States Patent
Bachelor et al.

(10) Patent No.: US 9,558,441 B2
(45) Date of Patent: Jan. 31, 2017

(54) LEGACY APPLICATION MIGRATION TO REAL TIME, PARALLEL PERFORMANCE CLOUD

(75) Inventors: Douglas Wiley Bachelor, Groton, MA (US); Raul Hugo Curbelo, Sturbridge, MA (US); Elizabeth Winters Elkins, Pompano Beach, FL (US); Christie Patrick McGrath, Las Vegas, NV (US); Simon Byford Moss, Cos Cob, CT (US); Thomas C. Fountain, Madison, NJ (US)

(73) Assignee: Pneuron Corp., Nashue, NH (US)

( * ) Notice: Subject to any disclaimer, the term of this patent is extended or adjusted under 35 U.S.C. 154(b) by 0 days.

(21) Appl. No.: 13/442,353

(22) Filed: Apr. 9, 2012

(65) Prior Publication Data

US 2012/0259909 A1  Oct. 11, 2012

Related U.S. Application Data

(63) Continuation-in-part of application No. 12/870,348, filed on Aug. 27, 2010.
(Continued)

(51) Int. Cl.
*G06F 15/16* (2006.01)
*G06N 3/02* (2006.01)
(Continued)

(52) U.S. Cl.
CPC .............. *G06N 3/02* (2013.01); *G06F 9/4843* (2013.01); *G06F 9/541* (2013.01); *G06Q 10/06* (2013.01); *G06Q 10/067* (2013.01)

(58) Field of Classification Search
None
See application file for complete search history.

(56) References Cited

U.S. PATENT DOCUMENTS 6,470,389 B1 * 10/2002 Chung et al. ................. 709/227
7,685,083 B2    3/2010 Fairweather
(Continued)

FOREIGN PATENT DOCUMENTS

| JP | 2004-538542 | 12/2004 |
| JP | 2005-520224 | 7/2005 |
| JP | 2006-73007 | 3/2006 |

OTHER PUBLICATIONS

International Search Report and Written Opinion in PCT Application PCT/US2012/032726, Jul. 1, 2012 US PTO.
(Continued)

*Primary Examiner* — Umut Onat
(74) *Attorney, Agent, or Firm* — Thompson Hine LLP

(57) ABSTRACT

A system and method 10 that provides legacy software applications 12 to be incorporated into a massively parallel and distribution processing model in the Cloud, with a high performance parallel and distributed computing (cloud) "wrapper" 14 around legacy and current systems to enable, without legacy product code change or invasive addition/editing, the legacy product to access and fully utilize the power and ability of distributed computing within the cloud through a Pneuron "cortex" platform virtual server 10. The system and method also provides the ability to distribute multiple, concurrent instances of the legacy applications, dynamically manage the load volumes, and automatically create and remove new virtual machines based upon demand requirements.

8 Claims, 4 Drawing Sheets

Related U.S. Application Data

(60) Provisional application No. 61/472,812, filed on Apr. 7, 2011.

(51) Int. Cl.
   *G06Q 10/06* (2012.01)
   *G06F 9/48* (2006.01)
   *G06F 9/54* (2006.01)

(56) References Cited

U.S. PATENT DOCUMENTS

| | | |
|---|---|---|
| 8,069,242 B2 | 11/2011 | Hadar et al. |
| 2002/0029340 A1 | 3/2002 | Pensak et al. |
| 2002/0161624 A1 | 10/2002 | Bradlee |
| 2003/0033265 A1 | 2/2003 | Cabana et al. |
| 2003/0058277 A1 | 3/2003 | Bowman-Amuah |
| 2004/0122937 A1 | 6/2004 | Huang |
| 2005/0090908 A1 | 4/2005 | Tamura |
| 2005/0149459 A1 | 7/2005 | Kofman et al. |
| 2005/0234799 A1 | 10/2005 | Hansen et al. |
| 2006/0184410 A1 | 8/2006 | Ramamurthy et al. |
| 2006/0242155 A1 | 10/2006 | Moore |
| 2007/0078692 A1 | 4/2007 | Vyas |
| 2007/0157211 A1* | 7/2007 | Wang ................. G06F 9/30181 719/313 |
| 2008/0133287 A1 | 6/2008 | Slattery |
| 2009/0113049 A1 | 4/2009 | Nasle et al. |
| 2009/0254572 A1 | 10/2009 | Redlich et al. |
| 2009/0276771 A1* | 11/2009 | Nickolov et al. ............. 717/177 |
| 2010/0064033 A1* | 3/2010 | Travostino et al. .......... 709/220 |
| 2010/0070448 A1 | 3/2010 | Omoigui |
| 2010/0070600 A1 | 3/2010 | Schulzrinne |
| 2010/0077205 A1 | 3/2010 | Ekstrom et al. |
| 2010/0189099 A1* | 7/2010 | Bae et al. ..................... 370/352 |
| 2010/0250497 A1 | 9/2010 | Redlich |
| 2010/0293123 A1* | 11/2010 | Barrett et al. .................. 706/13 |
| 2011/0131589 A1* | 6/2011 | Beaty et al. .................. 719/318 |
| 2011/0227754 A1 | 9/2011 | Hill |
| 2012/0102103 A1* | 4/2012 | Jacobson et al. ............. 709/204 |
| 2013/0086039 A1 | 4/2013 | Salch et al. |
| 2013/0086064 A1 | 4/2013 | Salch et al. |
| 2013/0091122 A1 | 4/2013 | Salch et al. |

OTHER PUBLICATIONS

"Migrating Legacy Applications to the Service Cloud", on line in proceedings of Object Oriented Programming, Systems, Languages and Applications (OOPSLA) 2009 Towards best practice in Cloud Computing Published 2009 http://www.soacloudbestpractices.com/towards_best_practices_sammersalt p. 59-68, Zhang et al.

"Encapsulation of legacy software; A technique for reusing legacy software components" online in Annals of Software Engineering, vol. 9 Issue 1-4 Published 2000 p.293-313, http://reversingproject.info/project_reversing_references/pdf/encapsulation_of_legacy_software.pdf, Sneed.

International Preliminary Report on Patentability, PCT/US2012/032726, mailed Oct. 17, 2013 (4 pages).

Japanese Notice of Reason(s) for Rejection, Translation, JP2012-527026, mailed Feb. 4, 2014, 3 pages.

International Search Report and Written Opinion, PCT/US10/46971, mailed Nov. 23, 2010, 8 pages.

International Preliminary Report on Patentability, PCT/US10/46971, mailed Feb. 28, 2012, 4 pages.

International Search Report and Written Opinion, PCT/US2012/069483, mailed Mar. 22, 2013, 7 pages.

Singapore Search Report, SG201201374-4 mailed Oct. 4, 2013, 6 pages.

Singapore Written Opinion, SG201201374-4 mailed Oct. 4, 2013, 10 pages.

International Search Report and Written Opinion, PCT/US2013/050673, mailed Mar. 4, 2014, 7 pages.

XMLNews.org, XML Basics, 1999, available at http://web.archive.org/web/20120627074440/http://xmlnews.org/docs/xml-basics.html, 6 pages.

* cited by examiner

LEGACY APPLICATION MIGRATION TO REAL TIME, PARALLEL PERFORMANCE CLOUD

CROSS-REFERENCE TO RELATED APPLICATIONS

This application is a continuation-in-part of U.S. patent application Ser. No. 12/870,348 filed on Aug. 27, 2010 and entitled "System and Method For Employing The Use Of Neural Networks For The Purpose Of Real-Time Business Intelligence And Automation Control" and claims the benefit of U.S. Provisional Patent Application No. 61/472,812 entitled "Legacy Application Migration To Real Team, Parallel Performance Cloud", which was filed on Apr. 7, 2011, both of which are incorporated herein by reference

TECHNICAL FIELD

The present invention relates to cloud computing, parallel processing, distributed computing, fault tolerance, and load balancing and more particularly, relates to a system and method for providing legacy software applications to be incorporated into a massively parallel and distribution processing model in the Cloud

BACKGROUND

Cloud computing is considered one of the top transformational IT changes and trends in 2010 and onwards. Cloud computing provides a scalable, dynamic, and distributed infrastructure for enabling applications to dynamically obtain and utilize computing resources on demand.

Most businesses have existing computer software applications that are not engineered or architected for cloud computing. Many existing applications cannot perform distributed and parallel processing and are unable to be deployed on an elastic cloud computing environment without significant changes to the existing applications' source code and application architecture. The challenge is applying a cost effective and simple migration and transformation process for legacy applications and products so that they can be incorporated into the cloud computing environment.

A legacy system or application program is a previously deployed third party or internally developed customer application that continues to be used, typically because it still functions for the users' needs or is too expensive to replace, even though newer technology or more efficient methods of performing a task are now available. Legacy applications include programs having JAVA® command lines, client and server applications based on JAVA® thin client, MICROSOFT® thin client and server-based applications, Client/Server applications, Client workstation applications, third party independent software vendor applications, and proprietary client applications running on proprietary architectures and operating systems. Legacy application programs are typically serially programmed, linear in performance, residing in only one data center and with a limited number of users constrained by geographic or business location.

To implement an existing legacy application in the cloud computing environment and enable the application to be distributed, parallel, and demand-elastic is a very expensive and time-consuming activity. The existing application architecture and source code needs to be re-factored and significantly rewritten, tested extensively, and re-integrated with its existing applications.

The cost and time to implement such a legacy application re-write can exceed the original cost and development time. Given these impediments, businesses are unable to adapt their existing applications to the cloud computing environment. The new Cloud paradigm offers huge business and technical value including parallel processing, distributed, use anywhere, high performance, high resiliency, high accessibility and high availability.

This significant divergence in technology deployment and accessibility creates a significant challenge: the cost effective and manageable ability to migrate applications, best processes and institutionalized intellectual property from serial, linear, data center or application confined applications to a new technology paradigm of agile, competitive, massively performed, use anywhere and broadly distributed/accessible functions. It is this challenge that the invention specifically addresses.

Accordingly, the objective of the present invention is to provide a non-intrusive and assimilation model which enables these legacy applications to be "transformed" from standalone, serial-based computing to highly distributed, parallel processing and cooperating cloud application services. The innovation combines the cloud-centric, distributed, and parallel processing Pneuron platform infrastructure with a suite of Pneuron legacy wrapper libraries to assimilate or "wrap" and encapsulate legacy applications and enable them to operate within the Pneuron cloud computing platform.

The present invention incorporates technology and process innovation, using the assignee's distributed "Pneuron platform" computing design and high performance, highly resilient virtual server for the migration of legacy applications to cloud that is simple, quick and a fraction of the cost of traditional migration and porting solutions and referred to herein as the "Pneuron platfom" or "Pneuron Platform and technology" or "Pneuron technology" or simply "Pneuron".

SUMMARY

The present invention relates to cloud computing, parallel processing, distributed computing, fault tolerance, and load balancing and more particularly, relates to a system and method for providing legacy software applications to be incorporated into a massively parallel and distribution processing model in the Cloud having the ability to provide simple, real time, high performance parallel and distributed computing (cloud) "wrapper" around legacy and current systems to enable, without legacy product code change or invasive addition/editing, the legacy product to access and fully utilize the power and ability of distributed computing within the cloud through the Pneuron "cortex" platform virtual server.

The present invention also provides a system and method to distribute multiple, concurrent instances of the legacy applications, dynamically manage the load volumes, and automatically create and remove new virtual machines based upon demand requirements.

The system and method of the present invention facilitates inter-processing connections between distributed applications, enabling the passing of information and execution of processing across participating application nodes. Also disclosed is and innovative process for incorporating these applications into its distribution framework and enables comprehensive processing from work initiation through completion.

The present invention further features a system and method for the alignment of a business process for the use of the Pneuron platform and technology to enable refactoring and migration of legacy applications and traditional products systems into a high availability, fault tolerant, load balancing, parallel and distributed processing within a cloud virtualization computing environment. Adding to the original distributed data and analysis, this addition adds the ability to incorporate and distribute entire applications using Pneuron technology and enable existing applications to realize quickly and cost effectively the value of modern distributed cloud computing.

One key to the design of the present invention is the ability to rapidly encapsulate and incorporate any and all non-cloud computing applications into a highly elastic virtual infrastructure within the Cloud, without significantly modifying the application source or applying invasive changes to the application.

The unique process, combined with the integration to the Pneuron platform, enable speed in deployment and rapid ability to apply a parallel, distributed cloud processing model to a current "legacy" application with no reprogramming requirements, combined with industrial strength security, agility, resiliency and consumerability that forms one of the basis of this invention.

DESCRIPTION OF THE DRAWINGS

These and other features and advantages of the present invention will be better understood by reading the following detailed description, taken together with the drawings wherein.

DESCRIPTION OF THE INVENTION

Figure 1:
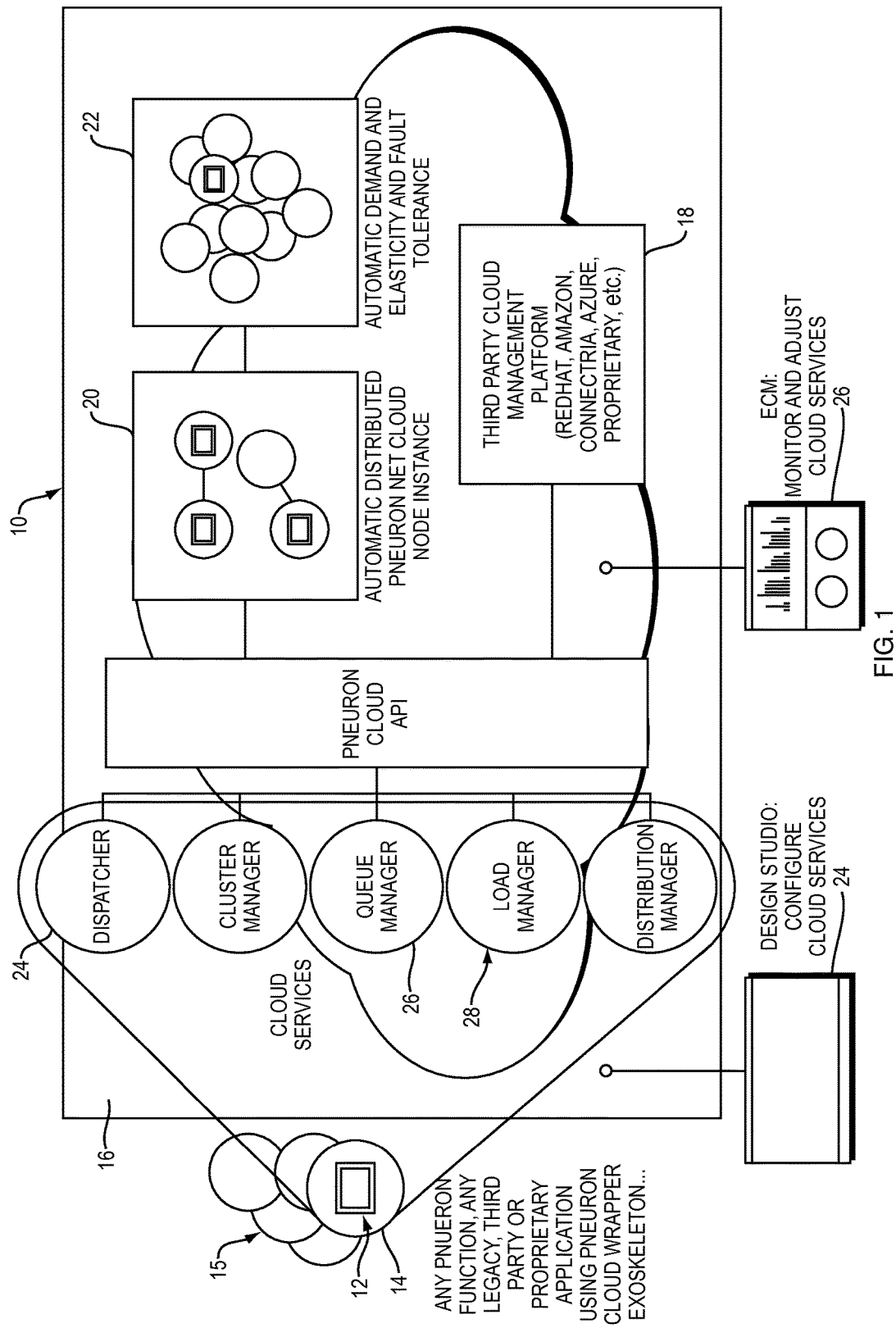
FIG. 1 is a schematic diagram of a neuron cloud environment in which a pneuron wrapped legacy application interacts in accordance with the present invention.

The attached drawings and description (beginning with FIG. 1) highlight the Pneuron server ("Cortex") environment 10 in accordance with the present invention and its ability quickly, cost effectively and seamlessly "wrap" existing products 12 with a high performance API 14 and connect seamlessly to the Pneuron Cloud Virtual Server (Cloud Cortex) 16. The Pneuron server 16 has an interface to commercial cloud management systems 18. Different cloud management systems and environments can be supported by extending the cloud management adapter library and not affecting the overall Pneuron platform. In this manner, cloud services can be monitored and adjusted 27 while also enabling cloud services to be configured 25.

The external interface (wrapper API 14) enables an existing software product 12 to fully leverage massively parallel, highly distributed, horizontally and vertically resilient and available scale and so increase in performance through Pneuron parallel processing, automatically clone multiple instances 20 of the same application to ensure volume and load is managed in parallel (rather than serially in current solutions) and enable access and instantiation of the application anywhere within the cloud while maintaining automatic demand and elasticity and fault tolerance 22.

The present invention features an innovative process and technology within its Pneuron platform service that enables legacy/third party non-cloud designed software applications to be incorporated into a massively parallel and distribution processing model in the Cloud. The process is made up of a number of simple steps using the Pneuron technology wherein:

A. Existing legacy applications are "wrapped" with a Pneuron service Interface or "Wrapper"/"Exoskeleton". These "wrappers" are incorporated into a Pneuron wrapper library and preconfigured and enable "off the shelf" available interface instantiations specifically mapped to the target application's API. The "wrapper" is best considered an exoskeleton connection service which includes an encapsulation of an API, all base Pneuron functions and characteristics, security logic specific to the technology and services enabling the connection to the hyper fast, resilient, clustered Pneuron "cortex" Platform residing in the cloud. Wrappers are off the shelf and aligned to the specific type of technology including:

JAVA® based command-level programs;

JAVA® Thin client server based applications;

MICRSOFT® WINDOWS® Thin client server based applications;

Fat Client applications;

Third Party applications; and

Mainframe applications.

Each "wrapper", once deployed, allows applications to be cloud enabled including parallel processing, on-demand vertical and horizontal scale, auto-cloning to enable load sharing and deep resiliency, high availability and clustering in either private or public cloud.

The Pneuron solution is agnostic to the interface type or application requirements—Database, a Service, an abstract, table interface, HTTP sniffer or any number of methods to ensure maximum performance and connectivity.

These wrappers, in simple terms, enable different applications to interact transparently with the Pneuron platform.

Figure 2:
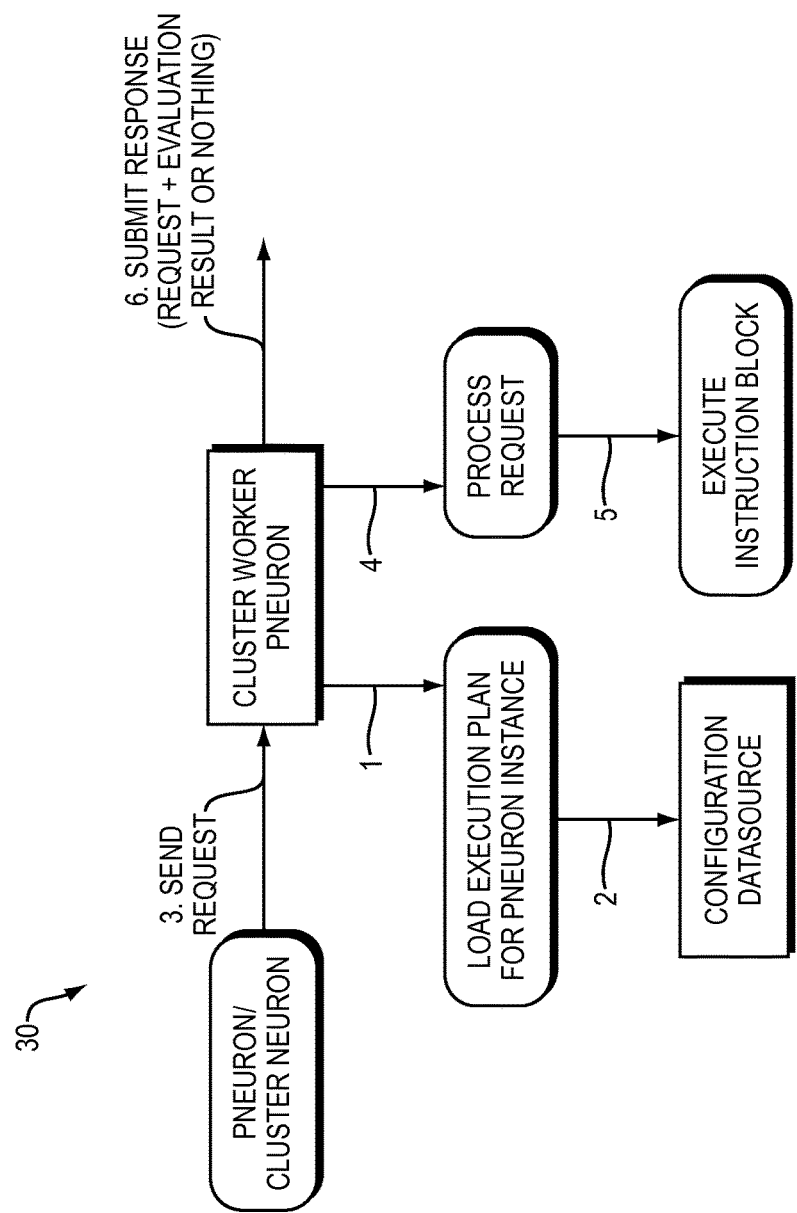
FIG. 2 is a flowchart illustrating the legacy application wrapper invocation model in accordance with the teachings of the present invention.

An example of a wrapper invocation model is provided as 30, FIG. 2. The execution plan concept is as follows:

```
invoke(method1, paramlist)
invoke(method2, paramlist)
. . .
Invoke(method3, paramlist)
```

Figure 3:
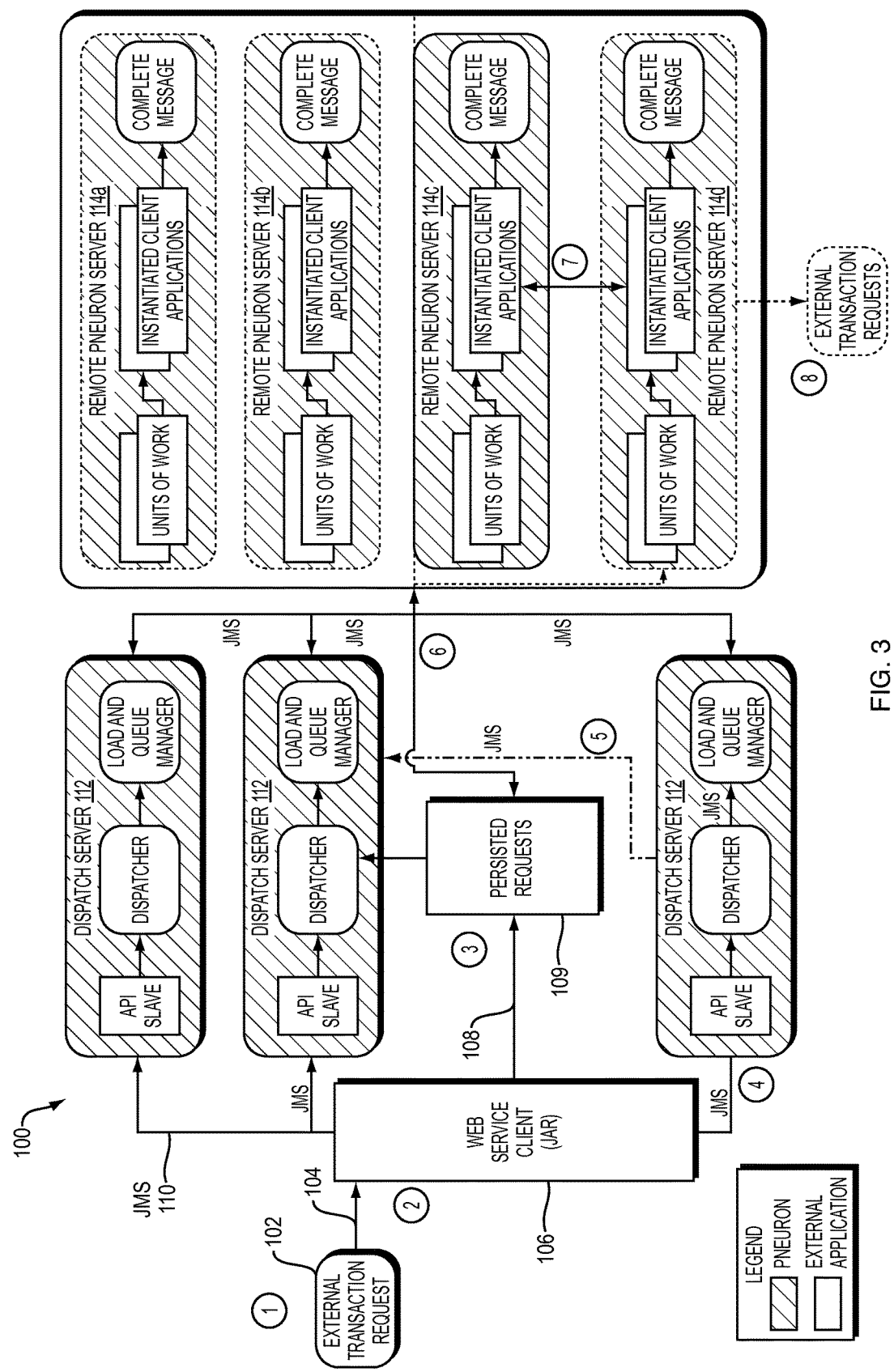
FIG. 3 is a diagram and flowchart illustrating the runtime processing model for a legacy application wrapped with a pneuron operable on the pneuron based cloud system in accordance with the teachings of the present invention.

If required, the present invention can store partial results from previous executions and use those as parameters depending on the complexity of the operation at hand. The invoke method shown in FIG. 3 is based on the reflection process. In this way, the client can provide JAR files or provide from the beginning a collection of JAVA® source files that will be incorporated in the project from an early stage, or simply have them added at runtime as a JAR type file import. In this way, the client has the possibility to use different calls from different class instances (actually object instances for those classes) and organize those in a way (instruction code block) that will allow the client to organize the logic and create the proper integration of the code.

A sample call (concept) is shown below:

```
Aux
  inst1val=objConf1instance.invoke("methodconfigname1",
  paraminputList)
Aux
  inst2val=objConf1instance.invoke("methodconfigname1",
  paraminputList.Inst1val)
  ....
Rez
  instWval=objconfxinstance.invoke("methodw",parameters)
  ....
Rez
  instNval=objconfxinstance.invoke("methodn",parameters)
    Result=OriginalXmlRequest + InstWval + InstNval (tags)
```

Once the applications are "wrapped", the applications are represented as Pneurons 15, FIG. 1, within the Pneuron Platform. The applications can then be incorporated into Pneuron networks and linked to the different Pneuron applications, including the Design Studio 25, Enterprise Control Manager 27, and the Admin application 18. The wrapped legacy Pneurons 15 now have configuration plans established. During the runtime processing, the Pneuron "cortex" platform orchestrates the remote instances of the configured Pneuron networks and enables the target legacy application to initiate multi-threaded requests, transmit and fully utilize a high availability, elastic and resilient architecture.

This "cortex" platform is a high performance, cloud enabled virtual server that enables the wrapped legacy application 15 to dynamically create and remove new cloud nodes and automatically deploy new application images with remote instances of the legacy application operating within the Pneuron platform. Specific functions applied include: auto load share; distribution and accessibility across multiple data centers to utilize capacity anywhere within the cloud; auto-clone as and when necessary for automated capacity and performance balancing; scale vertically and horizontally without manual initiation; auto-restart in different location if the application encounters critical errors or failure to operated; and seamlessly integrates with other applications within the cloud as if the application has been fully and completely reconfigured for distributed, virtualized cloud operation.

The API Wrapper Pneuron 14 provides a common interface and facility for receiving and processing external application requests. The API Pneuron marshals these requests to the Dispatcher Pneuron 24 for evaluation and processing.

The Dispatcher Pneuron 24 transmits the durable messaging requests to the Intelligent Load Balance 28 and Queue Management 26 Pneurons, which are monitoring the Pneuron remote worker instances and work queues and assigning work to the legacy applications. Based on load evaluation, the Intelligent Load Balance and Queue Management Pneurons instantiates new cloud nodes based on demand and automatically propagate another remote instance and distributes work.

The legacy application wrapped Pneuron 15 performs its work and then interacts with external applications automatically. The API Wrapper Pneuron interacts with Master Pneuron components, which manage requests, keep counts of work in process, perform load balancing, marshal work to distributed wrapped legacy application instances, instantiate new instances of the legacy applications and remove instancesased on load and threshold levels.

External transaction requests 102, FIG. 3, occur through HTTP requests 104. External transaction requests will initiate an API request to the Web Service Client (JAR) 106. The Web Service Client 106 takes the WSDL and turns it into a Java® call 108. The JAVA® call request message 108 will be stored in the database. All units of work are persisted in a Pneuron persisted queue 109 for resilience, elasticity and high availability.

Figure 4:
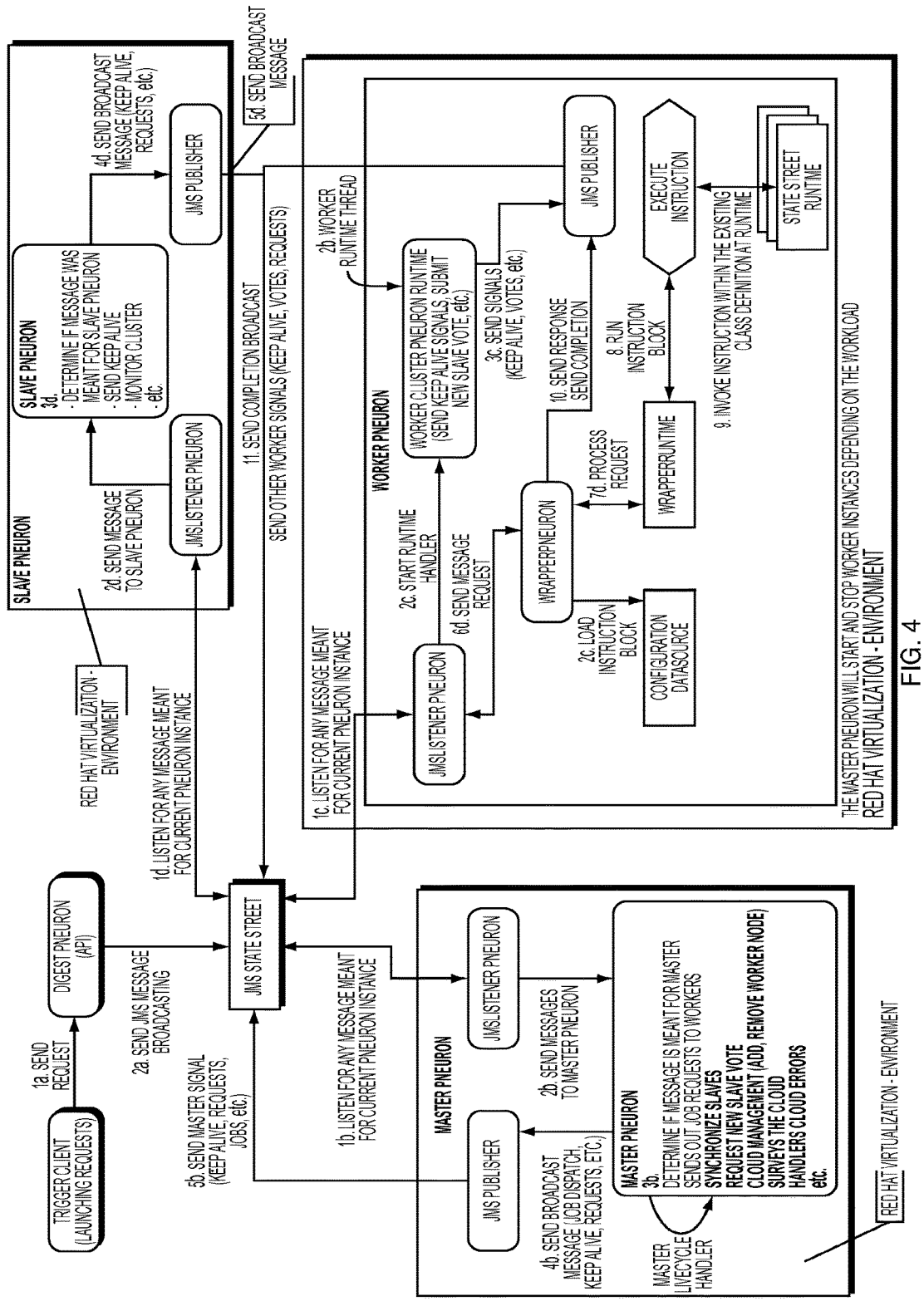
FIG. 4 is a schematic diagram and flowchart of a cloud integration model showing the interaction between master pneurons, slave pneurons and worker pneurons in accordance with the teachings of the present invention.

The Web Service Client 106 sends a JMS broadcast 110 to subscribed Master and Slave Dispatchers 112. There can be any number of Masters and Slaves and generally the number is a result of the amount of volume at any given time. This enables a dynamic creation and destruction of Pneurons which in turn allows real time volume spikes to be managed simply, allows for maximum use of available system resources no matter where within the cloud they reside and enables real time application management. A more detailed view of the master, slave and worker pneuron relationship is shown in FIG. 4.

The Master API obtains an instruction from the wrapped application (a message, a volume spike, a system crash, request to access from a location or any number of other instructions) and forwards it to the Dispatcher Pneuron. The Dispatcher Pneuron communicates with the Load and Queue Manager. If the Dispatcher is no longer the primary master—for example it goes down or the Hardware or data center supporting it is no longer accessible, the Slave will take over, applying the required units of work or activity spooling up more processing power, moving a message, cloning the application, providing secure access to the application to the requesting remote user.

The Load and Queue Manager keeps a running count of all units of work—or instructions and activities—and has to figure out which Pneuron Server 114 to hand it to for processing. Based on round robin and thresholds, it will hand the message to a Worker Instance. If all workers are busy or otherwise not available (for any reason), the Load and Queue Manager instantiates a new remote instance and server in real time. Based on thresholds, low work volume would remove remote instances and servers. The real time creation and destruction of instances, servers and nodes is a direct calibration to the volume of instructions and activities within the platform.

Inter-process communications occurs between the Master Dispatcher and the Slave Dispatcher to ensure the viability of the Dispatcher. If the communications are disrupted, the Slave Dispatcher will become the new Master dispatcher and a second take Slave over as Dispatcher the Master will be instantiated. This auto-hierarchy enables deep resiliency—if the Master fails (a server failure or data center crash) and the Master can no longer communicate and control the network, its queue, functions and all activities are instantly passed to a Slave which automatically becomes a Master.

The only time the Slave Dispatcher will get involved is switching from the master and it will use the persisted queue checkpoint 109 to start processing. When the slave becomes the master, it just re-queues everything.

The unit of work is passed from the Master Pneuron Server to the Remote Pneuron Server and the legacy wrapped Pneuron. The legacy wrapped Pneuron will perform the work. Multiple requests in flight are units of work. You can have applications or activities and have multiple Pneuron Servers. within a Pneuron Servers.

The Pneuron network will do the work directly. The load and capacity increasing and decreasing the Remote Pneuron Servers will similarly destroy and instantiate new Remote Pneuron Servers and un-persist the message from the queue (apply a dual message). The complete message Pneuron decrements the in-flight count to −1 (the in-memory queue).

Wrapped legacy applications 15 communicate and interface through Pneuron messaging protocols and initiates external transaction updates.

The benefits of the present invention include the ease of wrapping and incorporating existing applications into Cloud and distributed parallel processing infrastructure; rapid migration and transition to cloud infrastructures; automatic load and distribution of processing with platform-enabled instantiation of work queues, applications, and parallel processing on demand; and the ability to simultaneously process multiple concurrent applications sessions, reducing bottlenecks and accelerating complex, high resource processing into significantly shorter turnaround (processing jobs that take days can be reduced to hours and less).

Modifications and substitutions by one of ordinary skill in the art are considered to be within the scope of the present invention, which is not to be limited except by the allowed claims and their legal equivalents.

The invention claimed is:

1. A method, comprising:
 encapsulating a legacy software application within an exoskeleton connection service that is both configured to accept messages from a distributed processing service and mapped to an application programming interface of the legacy software application to create an encapsulated software object;
 deploying a first instance of the encapsulated software object into a cloud computing environment that includes the distributed processing service;
 receiving, by the first instance of the encapsulated software object and through the exoskeleton connection service, a processing request; and
 initiating multi-threaded processing of the processing request.

2. The method of claim 1, further comprising:
 deploying a second instance of the legacy software object to the cloud computing environment; and
 executing, by the second instance of the legacy software object and in the cloud computing environment, a portion of the processing request.

3. The method of claim 2, wherein the first instance of the legacy software object and the second instance of the legacy software object each reside on different nodes of the cloud computing environment.

4. The method of claim 3, further comprising:
 using the distributed processing service to send the processing request to the first instance of the legacy software object.

5. The method of claim 2, further comprising:
 using the distributed processing service to send a portion of the processing request to the second instance of the legacy software object.

6. The method of claim 1, further comprising:
 deploying, into the cloud computing environment, a dispatcher object that is configured to receive the processing request and send a portion of the processing request to a deployed instance of the encapsulated software object.

7. A non-transitory computer readable medium bearing computer program instructions that when executed by a computer cause the computer to perform steps of a process, comprising:
 encapsulating a legacy software application within an exoskeleton connection service that is both configured to accept messages from a distributed processing service and mapped to an application programming interface of the legacy software application to create an encapsulated software object;
 deploying a first instance of the encapsulated software object into a cloud computing environment that includes the distributed processing service;
 receiving, by the first instance of the encapsulated software object and through the exoskeleton connection service, a processing request; and
 initiating multi-threaded processing of the processing request.

8. A computer-implemented method, comprising:
 executing, on a processor, computer program instructions to cause a computer to encapsulate a legacy software application within an exoskeleton connection service to create an encapsulated software object;
 deploying a first instance of the encapsulated software object into a cloud computing environment that includes the distributed processing service;
 receiving, by the first instance of the encapsulated software object and through the exoskeleton connection service, a processing request; and
 initiating multi-threaded processing of the processing request;
wherein the exoskeleton connection service is configured to accept messages from a distributed processing service and is mapped to an application programming interface of the legacy software application.

\* \* \* \* \*